US007512601B2

(12) United States Patent
Cucerzan et al.

(10) Patent No.: US 7,512,601 B2
(45) Date of Patent: Mar. 31, 2009

(54) SYSTEMS AND METHODS THAT ENABLE SEARCH ENGINES TO PRESENT RELEVANT SNIPPETS

(75) Inventors: Silviu-Petru Cucerzan, Redmond, WA (US); Matthew R. Richardson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 398 days.

(21) Appl. No.: 11/037,569

(22) Filed: Jan. 18, 2005

(65) Prior Publication Data

US 2006/0161542 A1 Jul. 20, 2006

(51) Int. Cl.
*G06F 7/10* (2006.01)
*G06F 7/12* (2006.01)

(52) U.S. Cl. .................................... 707/5; 707/3; 707/6

(58) Field of Classification Search ............. 707/5, 707/3, 6
See application file for complete search history.

(56) References Cited

U.S. PATENT DOCUMENTS

| | | | | |
|---|---|---|---|---|
| 6,012,053 A * | 1/2000 | Pant et al. | ...................... | 707/3 |
| 6,269,361 B1 * | 7/2001 | Davis et al. | ...................... | 707/3 |
| 6,334,128 B1 * | 12/2001 | Norcott et al. | ................. | 707/5 |
| 6,516,312 B1 * | 2/2003 | Kraft et al. | ...................... | 707/3 |
| 6,581,057 B1 * | 6/2003 | Witbrock et al. | ............... | 707/5 |
| 6,931,397 B1 * | 8/2005 | Sundaresan | ..................... | 707/5 |
| 7,165,069 B1 * | 1/2007 | Kahle et al. | ................... | 707/10 |
| 2003/0115191 A1 * | 6/2003 | Copperman et al. | ........... | 707/3 |
| 2003/0172126 A1 * | 9/2003 | Brown et al. | ................ | 709/217 |
| 2004/0225667 A1 * | 11/2004 | Hu et al. | ..................... | 707/100 |
| 2006/0101003 A1 * | 5/2006 | Carson et al. | .................. | 707/3 |

\* cited by examiner

*Primary Examiner*—John E Breene
*Assistant Examiner*—Patrick E Sweeney
(74) *Attorney, Agent, or Firm*—Amin, Turocy & Calvin, LLP

(57) ABSTRACT

Systems and methods that provide search and/or query-relevant information and/or links thereto to a user as and/or with a search and/or query result. This information can be determined from summary information that can be included within a tag, header, body, meta-data, etc. of the data. A user can employ a local and/or web search utility along with a search word, phrase, sentence, etc. to search over a data repository to locate and retrieve data that satisfies the search criteria. The summary information of this data is obtained and matched against the results and/or search criteria to determine whether the data is relevant to the search and/or query. The summary information is utilized to determine a snippet that summarizes the data, based on the search and/or query, search criteria, etc. to provide the user with search and/or query-relevant results and/or one or more links thereto.

20 Claims, 11 Drawing Sheets

500

<meta name="SNIPPET" content="(matching-spec)|(snippet-spec)">

<meta name="SNIPPET" content="(matching-spec)|(snippet-spec)">

<meta name="SNIPPET" content="(matching-spec)|(snippet-spec)">

<meta name="SNIPPET" content="(matching-spec)|(snippet-spec)">

<meta name="SNIPPET" content="(matching-spec)|(snippet-spec)">

.
.
.

<meta name="SNIPPET" content="(matching-spec)|(snippet-spec)">

FIG. 5

SYSTEMS AND METHODS THAT ENABLE SEARCH ENGINES TO PRESENT RELEVANT SNIPPETS

TECHNICAL FIELD

The subject invention generally relates to search engines, and more particularly to systems and methods that facilitate search engines with presenting search and/or query-specific descriptions of pages to users.

BACKGROUND OF THE INVENTION

Technological advances in computer hardware, software and networking have lead to efficient, cost effective computing systems (e.g., desktop computers, laptops, handhelds, cell phones, servers . . . ) that can communicate with each other from essentially anywhere in the world in order to exchange information. These systems continue to evolve into more reliable, robust and user friendly systems. As a consequence, more and more industries and consumers are purchasing computers and utilizing them as viable electronic alternatives to traditional paper and verbal media for exchanging information. For example, many industries and consumers are leveraging computing technology to improve efficiency and decrease cost through web-based (e.g., on-line) services. For instance, consumers can search and retrieve particular information (e.g., via a search engine), purchase goods, view bank statements, invoke monetary transactions (e.g., pay a bill on-line), research products and companies, apply for employment, obtain real-time stock quotes, obtain a college degree, download files and applications, transmit correspondence (e.g., email, chat rooms . . . ), etc. with the click of a mouse.

In many instances, a search engine is utilized to search for information. In general, a search engine is a special program (e.g., computer executable instructions) designed to help find files (e.g., web pages, images, text . . . ) stored on a computer, for example, a public server or on one's own personal computer. A typical search engine allows a user to invoke a query for files that satisfy particular criteria, for example, files that contain a given word or phrase in a title or body. Web search engines generally work by storing information about a large number of web pages retrieved from the World Wide Web (WWW) through a web crawler, or an automated web browser, which follows essentially every link it locates. The contents of each web page are then analyzed to determine how it should be indexed, for example, words can be extracted from the titles, headings, or special fields called meta-tags. Data about web pages is stored in an index database for use in later queries. Some search engines store (or cache) all or part of a source page as well as information about the web pages. When a user invokes a query through the web search engine by providing key words, the web search engine looks up the index and provides a listing of web pages that best-match the criteria, usually with a short summary containing the document's title and/or parts of the text. Some web search engines employ a real-time approach, wherein information is obtained when a query is started rather than obtaining stored information through indexing. With this approach, the information is more up-to-date and there typically are less dead links and less system resources are needed, but more time is generally required to complete the request.

In general, the usefulness of a search engine depends on the relevance of the results it presents to a user and the presentation of such results. While there can be numerous web pages that include a particular word or phrase, some web pages may be more relevant, popular, or authoritative than others. Most search engines employ methods to rank the results to provide a "best" result first. How a search engine decides which pages are the best matches, and what order the results should be shown in, varies widely from one engine to another. Conventionally, the technique for displaying what the search engine considers relevant information about a web page to a user includes generating a summary of the text existing on the page or near the query term and presenting this to the user. However, such information may not be very informative or relevant to user. For example, such summary may be poor when the pages are complex, contain multiple occurrences of a query words, or use the query word(s) as tabs or in other complex page structures. Thus, there is need for a technique to provide and present query relevant information to a user.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and methods that provide search and/or query-related information to search engines, which can utilize this information to present results with search and/or query-relevant snippets (e.g., a brief passage or summary relevant to the search and/or query) and/or links thereto to a user. In general, upon obtaining search and/or query results, based on search and/or query criteria (e.g., one or more terms, a phrase, a sentence . . . ), the systems and methods can employ mechanisms that determine whether a resultant page (document, file, data, etc.) matches the search and/or query and how to generate a relevant snippet. The systems and methods can then generate a snippet for this page and return it and/or a link thereto to the user with or as part of the query results.

In various aspects of the invention, the systems and/or methods can include an analyzer mechanism that interrogates search results for information about the results, wherein this information can be utilized to summarize the results and/or the query. Such information can be data specifically placed within files, web pages, associated data, etc. for the purpose of generating such summary information. This information can include rich information created by an author of the data, another person with suitable privileges (e.g., another user, an editor, an organization, a visitor to a page, an administrator . . . ) and/or an automatic information generating mechanism, reside within the data itself (e.g., a header, a body . . . ), within meta-data, within source data utilized to generate the data, within remote information associated with the data, etc., and include specific text (e.g., words, phrases, sentences . . . ), images, etc. to present to the user, a link to such text, images, etc., and/or rules to generate the summary.

The systems and/or methods can also include a matching mechanism that scrutinizes the summary information to determine whether it matches the query. For instance, the matching mechanism can obtain the search criteria and compare it with the rich summary information. If the rich summary information matches any or all of the search criteria, this summary information can be presented to the user as part of the returned results. In another aspect of the invention, search criteria associated with previous searches by the user can also be utilized to facilitate matching summary information with the user's query. Examples of suitable algorithms that can be utilized to facilitate matching include, but are not limited to, matching text, patterns, a set of terms, and expressions. The system can also include a snippet generating mechanism. This mechanism facilitates determining and/or generating a snippet to present to the user. Examples of suitable algorithms that can be utilized to determine and/or generate such snippet include, but are not limited to, text, text with replacement, and pointers to one or more page locations. It is to be appreciated that such summary information can be included within HTML that is utilized to create a web page and can point to one or more existing sentences/fragments in a web document that contains useful information about the queried words. These locations can be specified in conformance with an HTML standard.

Conventional techniques for creating summary information include generating a summary of the text existing on and/or in a returned page, for example, near the query term, and then presenting this summary to the user as part of the query results. Thus, conventionally, the search engine arbitrarily determines what it considers to be relevant information for a particular web page for a particular user through a proximity scheme and then displays this information to the user. However, such information may not be very informative or relevant to the user. In addition, such summary may be poor when the pages are complex, contain multiple occurrences of a query words, or use the query word(s) as tabs or in other complex page structures.

The subject invention provides a novel improvement to such conventional approaches by utilizing rich query-specific information associated with (e.g., embedded within) data to facilitate determining relevant summary information to display with results. This approach can provide the ability to present a portion of a page that is relevant to an associated search and/or query; provide an end user with more informative information that is relevant to their search; and enable search engines to present more relevant snippets for the content of the retrieved pages. Further, this approach can reduce computational effort and speed up overall search processes because many snippets may not need to be generated on the fly. This approach can store snippets in memory, significantly reducing the I/O time required on a server.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5 illustrates exemplary syntax utilized for generating query-specific snippets.

DESCRIPTION OF THE INVENTION

Figure 1:
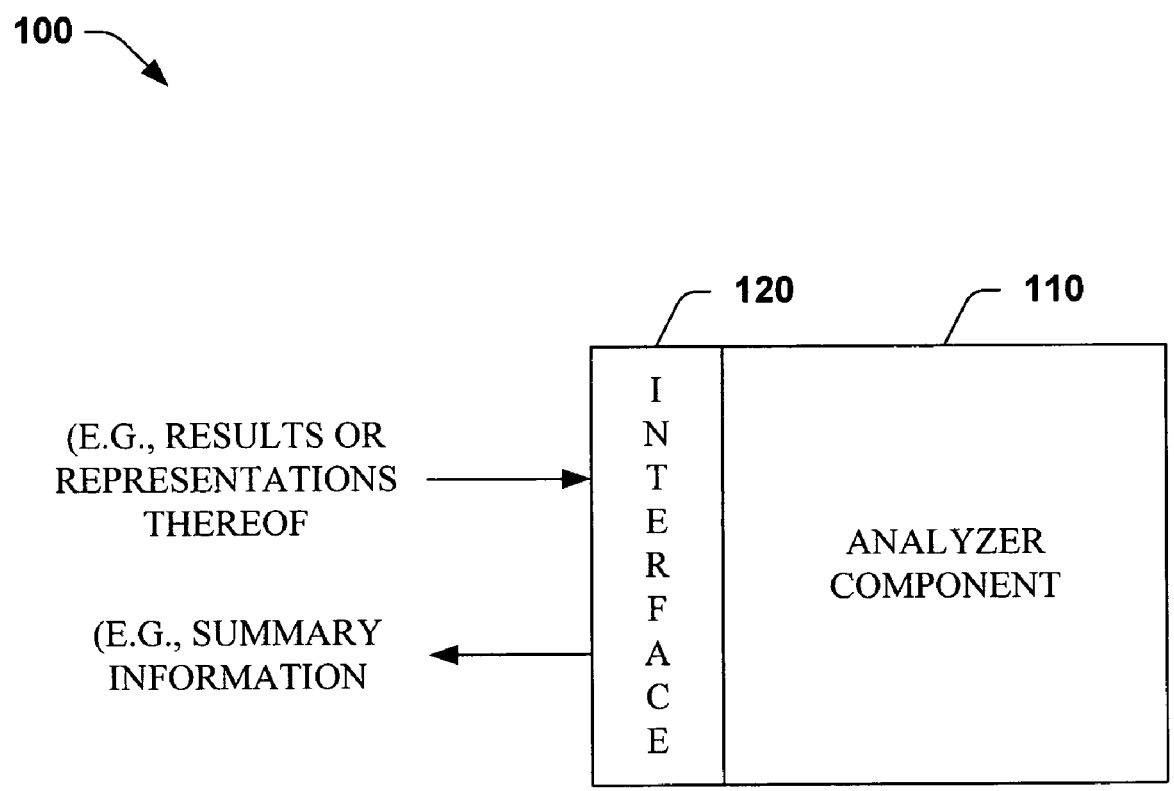
FIG. 1 illustrates an exemplary system that facilitates generating query-specific snippets.

The subject invention relates to systems and methods that provide search and/or query-related information to search engines, which can utilize this information to present relevant snippets and/or links to relevant snippets to a user with and/or as a result. In general, upon obtaining search and/or query results, based on search and/or query criteria (e.g., one or more terms, a phrase, a sentence . . . ), the systems and methods can employ a mechanism(s) that determines whether a resultant page, document, file, etc. matches the search and/or query and how to generate an associated snippet. The systems and methods can generate the snippet and return it and/or a link thereto to the user with and/or as the result.

Terms such as "component" and variations thereof are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program, a computer, and an industrial controller. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates determining summary information (e.g., a snippet) to present as or with search results. The system 100 includes an analyzer component 110 that can interrogate search results and/or associated, connected, linked, etc. information for data (e.g., rich data, page summaries, tags, indicia, synopses . . . ) that can be utilized to summarize the search results (e.g., returned pages that satisfied the search criteria) and/or the search. The search results can include various files, documents, web pages, etc. obtained from various storage media as described below. This information can be data specifically placed within the files, documents, web pages, etc. for the purpose of generating such summary.

In one aspect of the invention, the analyzer component 110 can work in connection with (e.g., executing within a similar or associated computer) or is part of a local and/or web search engine (not shown). In general, a local search engine can be utilized to search a local and/or networked computer, and a web search engine can be utilized to search repositories over the Internet. The analyzer component 110 can be invoked to obtain summary information from pages, documents, files, etc. that satisfy the search criteria. In another aspect of the invention, the analyzer component 110 can be notified when search results are available and then scrutinize the results to obtain the summary information. It is to be appreciated that the notification can be through a message, an event, an interrupt, a flag, a response to a subscription, and the like. In yet another aspect, the analyzer component 110 can poll (e.g., the query engine, a buffer, cache . . . ) to determine when search results are available to be searched. When available, the analyzer component 110 can search the results and provide the summary information. In still another aspect, the search results or a representation thereof can be provided to the analyzer component 110, which can interrogate the results to obtain such information.

It is to be appreciated that summary information obtained from a search result by the analyzer component 110 can include rich information, automatically and/or manually generated. For example, the rich information can be created by an information generating mechanism, artificial intelligence, an author of the data and/or other person with suitable privileges such as another user, an editor, an organization, a visitor to a page, an administrator, etc. By way of example, the author can include rich summary information within his/her data (e.g., a file, a web page, an image, an audio stream . . . ) and store such data in a location that can be searched such as a data repository searchable through a network. The rich summary information can reside within the data itself (e.g., a header, a body . . . ), within meta-data, within source data utilized to generate the data, within associated information located remote from the data, etc. Such summary information can include specific text (e.g., words, phrases, sentences . . . ), images, etc. to present to the user; a link to such text, images, etc.; rules to generate a summary, etc. In general, the summary information provides a summary of the data that can be presented (e.g., directly and/or indirectly) to the user in order to provide the user with informative, search related and/or search dependent information, which can facilitate the user with discriminating displayed results. This, in turn, facilitates the user with selecting results relevant to his/her search topic.

The foregoing can be utilized in connection with results from essentially any type of search. For example, the search can be over internal memory, portable memory, CD, DVD, Optical Disk, Tape, etc. associated with a personal computer. In another example, the search can be over a data repository that includes various databases, data stores, newsgroups, usenets, servers, tables, etc. Such search can be through an intranet, a bus, a backplane, a LAN, a WAN, the Internet, etc. In addition, the search can be performed over various data formats including, but not limited to, images, video, audio, text, web pages, etc. Moreover, the search can be achieved through virtually any data searching tool. The system 100 further includes an interface component ("interface") 120 that provides a mechanism to integrate the analyzer component 110 with data searching tools. For example, the interface 120 can provide various adapters, application programming interfaces, channels, connectors, etc. and support various communication and/or data exchange protocols.

Conventional techniques for creating summary information to display with or as search results include generating a summary of the text existing on and/or in a returned page, for instance, near the query term, and then presenting this summary to the user as part of the search results. Thus, conventionally, the search engine arbitrarily determines what it considers to be relevant information for a particular web page for a particular user through a proximity scheme and then displays this information to the user. However, such information may not be very informative or relevant to the user. In addition, such summary may be poor when the pages are complex, contain multiple occurrences of a query words, or use the query word(s) as tabs or in other complex page structures. The system 100 (and the other systems and methods described herein) provides a novel improvement to such conventional approaches by utilizing rich query-dependent information associated with (e.g., embedded within) data to facilitate determining relevant summary information to display with and/or as results and/or one or more links therewith to display with and/or as results.

It is to be appreciated that the foregoing approach can provide a web page, documents, file, etc. creator, maintainer, editor, etc. the ability to present a portion of a page, document, file, etc. that they feel is most appropriate and/or suitable for the invoked search; provide users with a better grasp of the relevance of a page, document, file, etc. to their search intent; and enable search engines to present more relevant snippets and/or links thereto for the content of the retrieved information. Further, this approach can reduce computational effort and speed up overall search processes because many snippets may not need to be generated on the fly. This approach can store snippets in memory, significantly reducing the I/O time required on a server.

Figure 2:
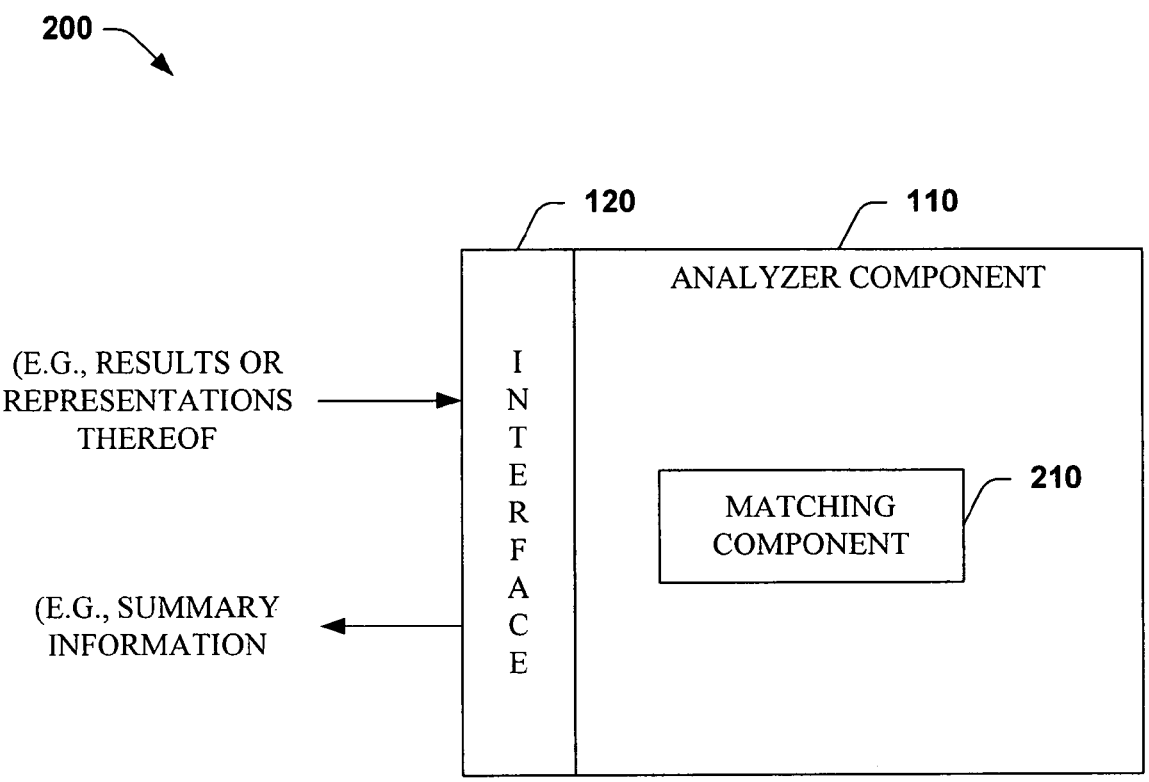
FIG. 2 illustrates an exemplary system that facilitates presenting query-specific snippets with query results.

FIG. 2 illustrates a system 200 that determines whether summary information associated with returned results matches a corresponding search and/or query. The system 200 includes the analyzer component 110 that can interrogate search results for information that can be utilized to summarize the results. The analyzer component 110 includes a matching component 210 that determines whether such information is relevant for to the search and/or query. Thus, the matching component 210 facilitates determining the summary (e.g., snippet) that can be provided with returned results and/or viewed through one or more links provided with the returned results.

By way of example, rich summary information can be included within data and the data can be stored in a searchable location. As noted previously, such summary information can be part of the data itself, meta-data, source data, linked information, etc., and include words, phrases, sentences and images, links thereto, and/or rules. A user can invoke a searching device to search the searchable location. Such searching device can include search options for providing a keyword(s), a calendar date(s), a geographical location(s), a file size(s), etc. Upon locating data that satisfies the search criteria, the analyzing component 110 can determine whether this data includes rich summary information. Where the analyzer component 110 determines the returned data includes data with rich summary information, the matching component 210 can be employed to determine whether such rich summary information is relevant to the search and/or query.

For example, the matching component 210 can scrutinize the rich summary information to determine whether it matches the search and/or query. For instance, the matching component 120 can obtain the search criteria and compare it with the rich summary information. If the rich summary information matches any or all of the search criteria, this summary information can be presented to the user as part of the returned results and/or obtained through one or more links therewith. If the rich summary information does not match any of the search criteria, conventional techniques for determining summary information (e.g., the proximity approach described above) can be utilized or the results can be deemed non-relevant and discarded. In another aspect of the invention, similar search criteria associated with previous searches by the user can also be utilized to facilitate matching summary information with the user's query. For example, the user may submit a subsequent query utilizing synonyms and/or variations of the search terms from a previous query. Such information can be obtained and utilized in conjunction with current search terms in order to determine whether results match the query.

It is to be appreciated that various matching algorithms can be utilized to determine whether the rich summary information matches the query. In addition, more than one such algorithm can be utilized over a given set of search results. Examples of suitable algorithms include, but are not limited to, matching text, patterns, a set of terms, and expressions. The following depicts specific examples of each of the foregoing:

| | |
|---|---|
| Text | "dog umbrellas" |
| Patterns | "dog umbrell*" |
| Term sets | "(dog,cat,pet) (umbrella,poncho,bumbershoot)" |
| Regular expressions | "[dD]og\s(umbrella\|poncho\|bumbershoot).*" |

These examples are provided for explanatory purposes and clarity, and do not limit the subject invention.

The system 200 further includes the interface 120 that provides a mechanism to integrate the analyzer component 110 and matching component 210 with data searching tools such as search engines, etc. As noted above, this approach of utilizing rich query-dependent summary information can mitigate returning uninformative and/or unrelated query results to a user.

Figure 3:
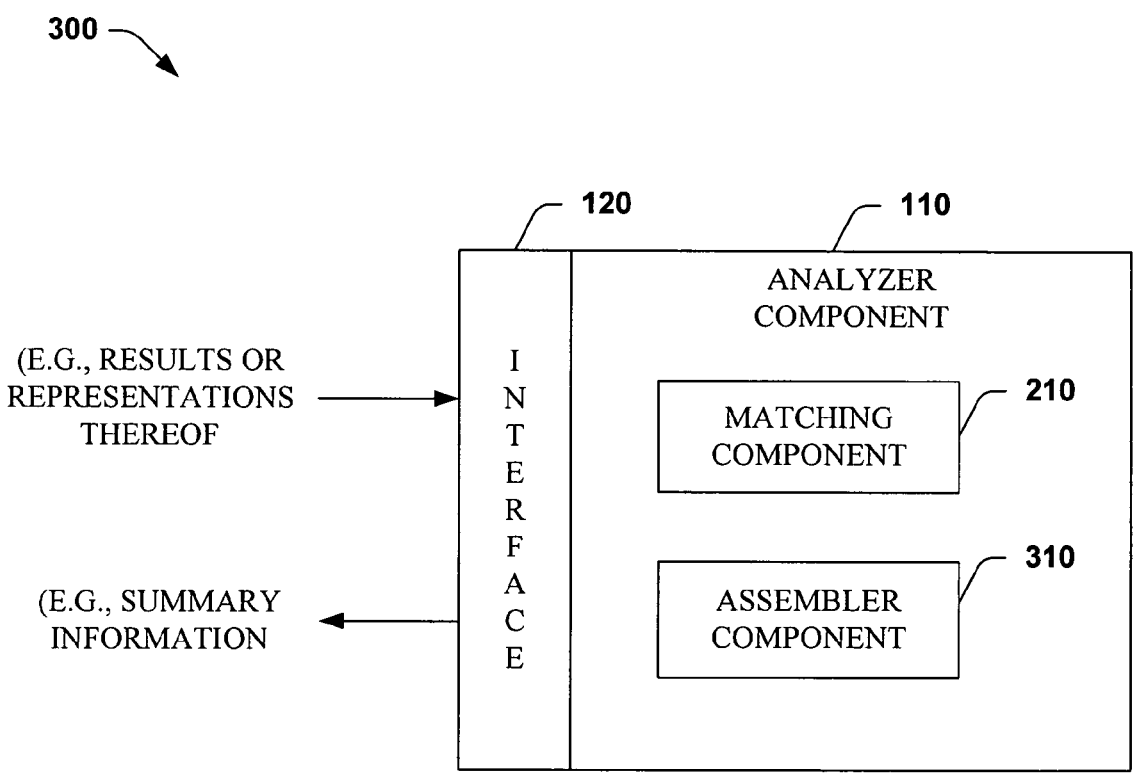
FIG. 3 illustrates an exemplary system that determines whether a snippet matches a given query.

FIG. 3 illustrates a system 300 that generates snippets to present with returned search results. The system 300 includes the analyzing component 110 and the matching component 210. As noted in connection with system 100 of FIG. 1, the analyzing component 110 can search results to determine whether rich summary information is included within data and/or associated therewith, wherein the rich summary information can be utilized to summarize and/or generate a summary of the results through a snippet and/or link presented to the user. As noted in connection with system 200 of FIG. 2, the matching component 210 can be utilized to determine whether any rich summary information located by the analyzing component 110 is relevant to the subject query.

The system 300 further includes an assembler component 310 that facilitates determining and/or generating a snippet (or summary). In general, the assembler 310 utilizes the rich summary information to determine and/or generate the snippet. It is to be appreciated that one or more algorithms can be utilized to determine and/or generate a snippet. Examples of suitable algorithms include, but are not limited to, text, text with replacement, and pointers to one or more page locations. The following depicts specific examples of each of the foregoing:

| | |
|---|---|
| Text | "the best selection of dog umbrellas!" |
| Text with replacement | "the best selection of {0}!" |
| Pointers to one or more page locations | "<dog_umbrellas>" |

These examples are provided for explanatory purposes and clarity, and do not limit the invention. Pointers can be utilized to point to one or more existing sentences and/or fragments in a document and/or an associated document that contains useful information about the queried words, which typically are in the document. These locations can be specified within an HTML standard by using anchor tags (<a>) or the like. The following provides one particular example: " . . . that <a name=dog_umbrellas> we carry the best selection of dog umbrellas in the world!</a> . . . "

By way of example, an automatic and/or manual mechanism can be utilized to include rich summary information within data, for instance, as part of the data itself, meta-data, source data, linked information, etc., and include words, phrases, sentences and images, links thereto, and/or rules. This data can be stored in a database, a server, a computer, etc. and made available for searching by users with authorization. In one instance, the data can be located within the public domain, wherein it is accessible over the Internet to anyone with Internet access. A user can employ essentially any querying tool to search this location via search terms. Upon locating this data and determining that it includes rich summary information that satisfies the search criteria, the matching component 210 can determine whether such rich summary information is relevant to the query. Upon determining that the rich summary information is relevant to the query, the assembler component 310 can determine a snippet. In one instance, at least a portion of the rich summary information is deemed a suitable snippet and presented to the user. In another instance, the rich summary information provides a generic phrase or sentence in which the search criteria can be inserted therein to create an informative snippet. In yet another instance, the rich summary information is linked to text that can be utilized as an informative snippet. It is to be appreciated that these examples are illustrative and not limitative, and are provided for sake of brevity and explanatory purposes.

Figure 4:
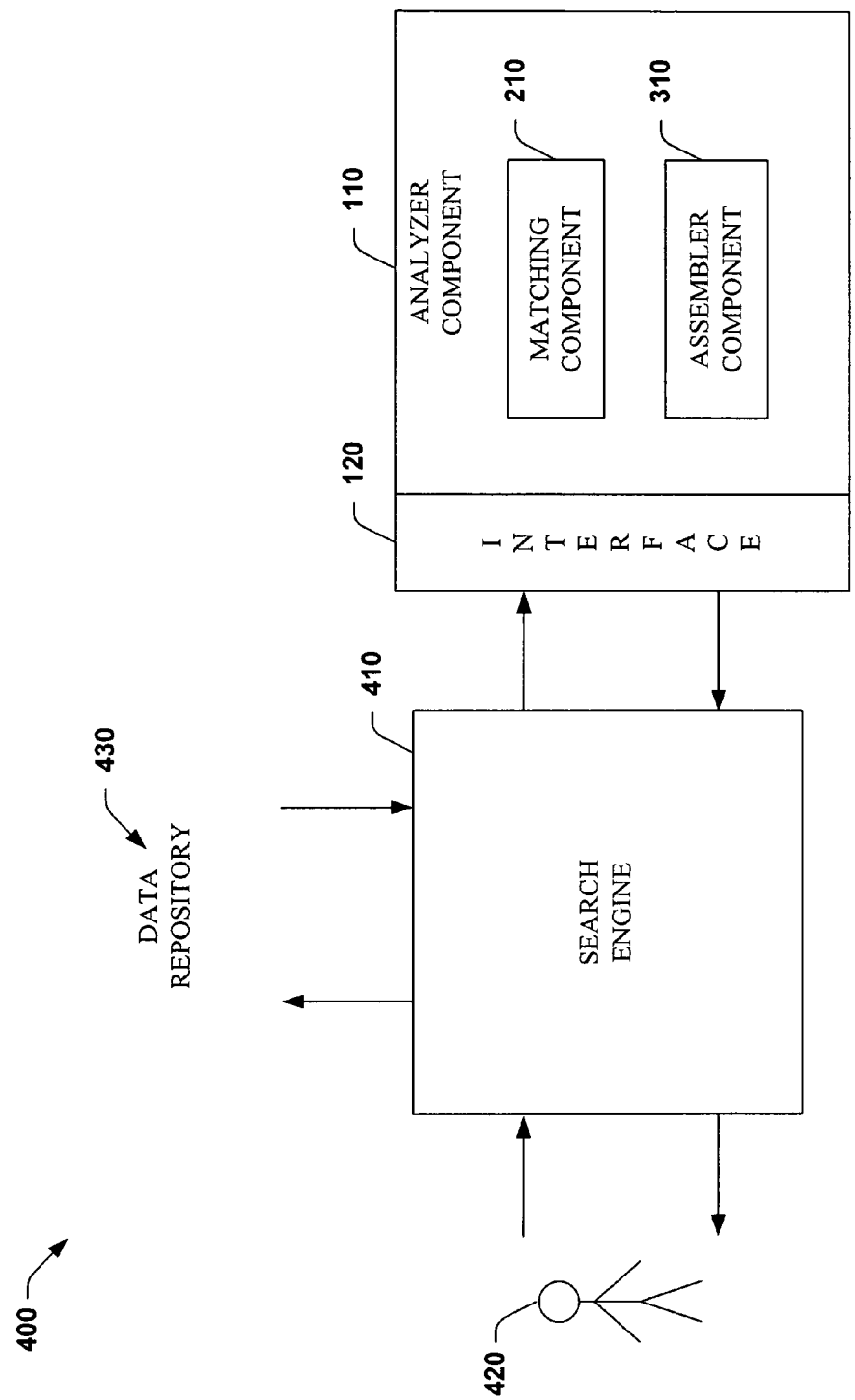
FIG. 4 illustrates an exemplary system that determines how a snippet is generated.

FIG. 4 illustrates a search system 400 that employs the analyzing component 110 to facilitate returning query relevant snippets to a user. The search system 400 includes a search engine 410, which can be employed by a user 420 to search over a data repository 430. The search engine 410 can be any known searching utility. As such, the search engine 410 can be utilized to search through files, web pages, images, text, etc. The repository 430 can include various storage mediums such as internal memory, portable memory, CD, DVD, Optical Disk, Tape, disk, database, networked server, etc.

The search engine 410 enables a user to query for data that satisfies particular criteria, for example, files (or documents, pages, etc.) that contain a given word or phrase in a title or body. In one instance, the search engine 410 can fetch files in the data repository 430 prior to a user search. The search engine 410 and/or indexer (not shown) therewith can read these files and create an index based on the words contained in each file. The contents of each file can be analyzed to determine how each file should be indexed, for example, words can be extracted from the titles, headings, or special fields called meta-tags. The index, which can be a list of the files and/or a subset thereof, can be presented to the requester based on an associated search. Typically, this list includes a link or other indicia for each item in the list, wherein this link enables the user to access and/or retrieve the corresponding file. For example, the list can include a hyperlink and/or a short summary. The usefulness of the summary depends on the relevance of its context in view of the query. Most traditional search engines employ methods to rank the results to provide a "best" result first. Conventionally, the technique for displaying what the search engine considers relevant information about a web page to a user includes generating a summary of the text existing on the page or near the query term and presenting this to the user. However, such information may not be very informative or relevant to a user. For example, such summary may be poor when the pages are complex, contain multiple occurrences of a query words, or use the query word(s) as tabs or in other complex page structures.

The system 400 can mitigate the aforementioned shortcomings of conventional systems through the analyzing component 110, the matching component 210 and the assembler component 310. For example, rather than utilizing a conventional approach wherein summary information is obtained through presenting text existing on a page or near a query term, the analyzing component 110, the matching component 210 and assembler component 310 can utilize rich summary information within the resultant pages to generate a query-related summary, such as, a summary deemed relevant to the resultant page. For instance, upon obtaining query results, the analyzing component 110 can search the results for rich summary information; the matching component 210 can scrutinize the rich summary information to determine whether it is relevant to the query; and the assembler component 310 can be utilized to determine how to generate the snippet from the rich summary information. The snippet and/or link thereto can then be returned as part of the results to provide the user with an informative, search and/or query-dependent summary of respective query results. In addition, a search and/or query-independent summary can be concurrently provided to the user.

FIG. 5 illustrates an exemplary technique for associating rich page-based summary information with data. With this technique, an author, an editor, an administrator, a visitor, etc. of a web page can include a query-dependent description within HTML source code, wherein this description can be utilized to match the page with a query to determine whether the page is relevant to the query, and to generate the snippet to directly present to the user and/or to present to the user through an associated link. In one instance, this approach can be implemented by enhancing a <meta> HTML tag in compliance with an existing HTML standard. For example, one or more snippets 500 can be included within HTML code. It is to be appreciated that the syntax utilized to depict the one or more snippets 500 is illustrative, and essentially any technique within HTML can be used, or any valid markup language syntax (e.g., XML, XTML . . . ) can be utilized in accordance with aspects of the invention.

It is to be appreciated that the foregoing approach can provide the ability to present a portion of a page that is most appropriate and/or suitable for a search and/or query that retrieves the page. In addition, this approach provides users with a more informative approach to deciphering the relevance of a page to their search intent. Furthermore, this approach enables search engines to present more relevant snippets for the content of the retrieved pages. Moreover, the proposed approach can reduce the computational effort and speed up the overall search process because many snippets may not need to be generated on the fly, and it may also be possible to store snippets in memory, significantly reducing the I/O time required on the server.

Figure 6:
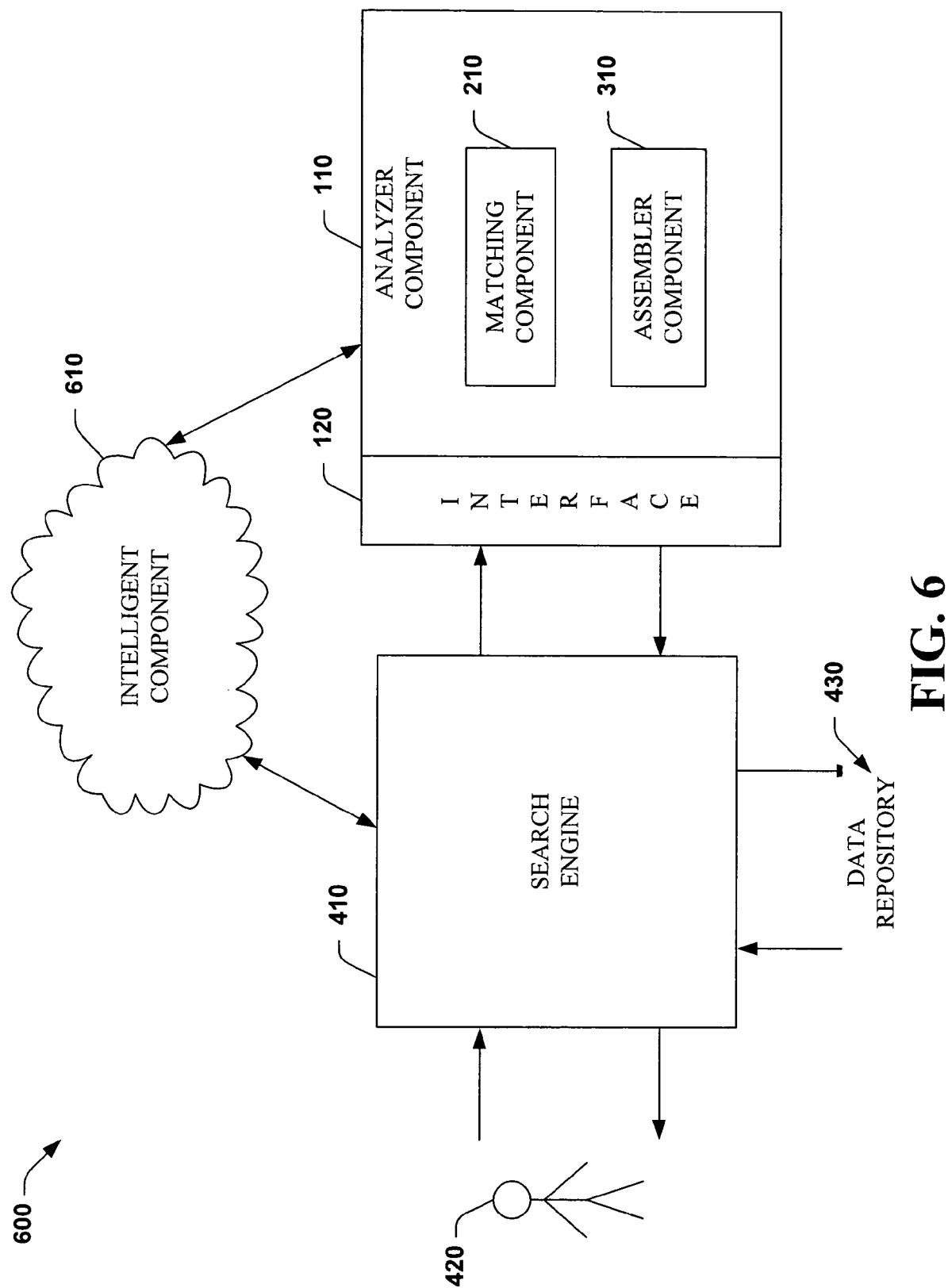
FIG. 6 illustrates an exemplary system that employs intelligence to facilitate determining snippets.

FIG. 6 illustrates a search system 600 that employs intelligence (e.g., machine learning) to facilitate determining relevant snippets. The system 600 includes the search engine 410, which can be employed by the user 420 to search over the data repository 430. The search engine 410 can be any known searching utility. In addition, the search engine 410 can invoke an intelligent component 610 to facilitate such searching. Upon locating data that satisfies search criteria, the intelligent component 610 can facilitate collecting and/or retrieving such data. The intelligent component 610 can further facilitate the analyzing component 110 with finding rich summary information within the data. The matching component 210 can employ the intelligent component 610 to facilitate determining whether the rich summary information is relevant to the query. The assembler component 310 can utilize the intelligent component 610 to facilitate determining how to generate the snippet from the rich summary information. Moreover, the intelligent component 610 can facilitate the search engine 410 with presenting the snippet to a user to provide the user with an informative, query-dependent summary of respective query results.

It is to be understood that the intelligent component 610 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 7:
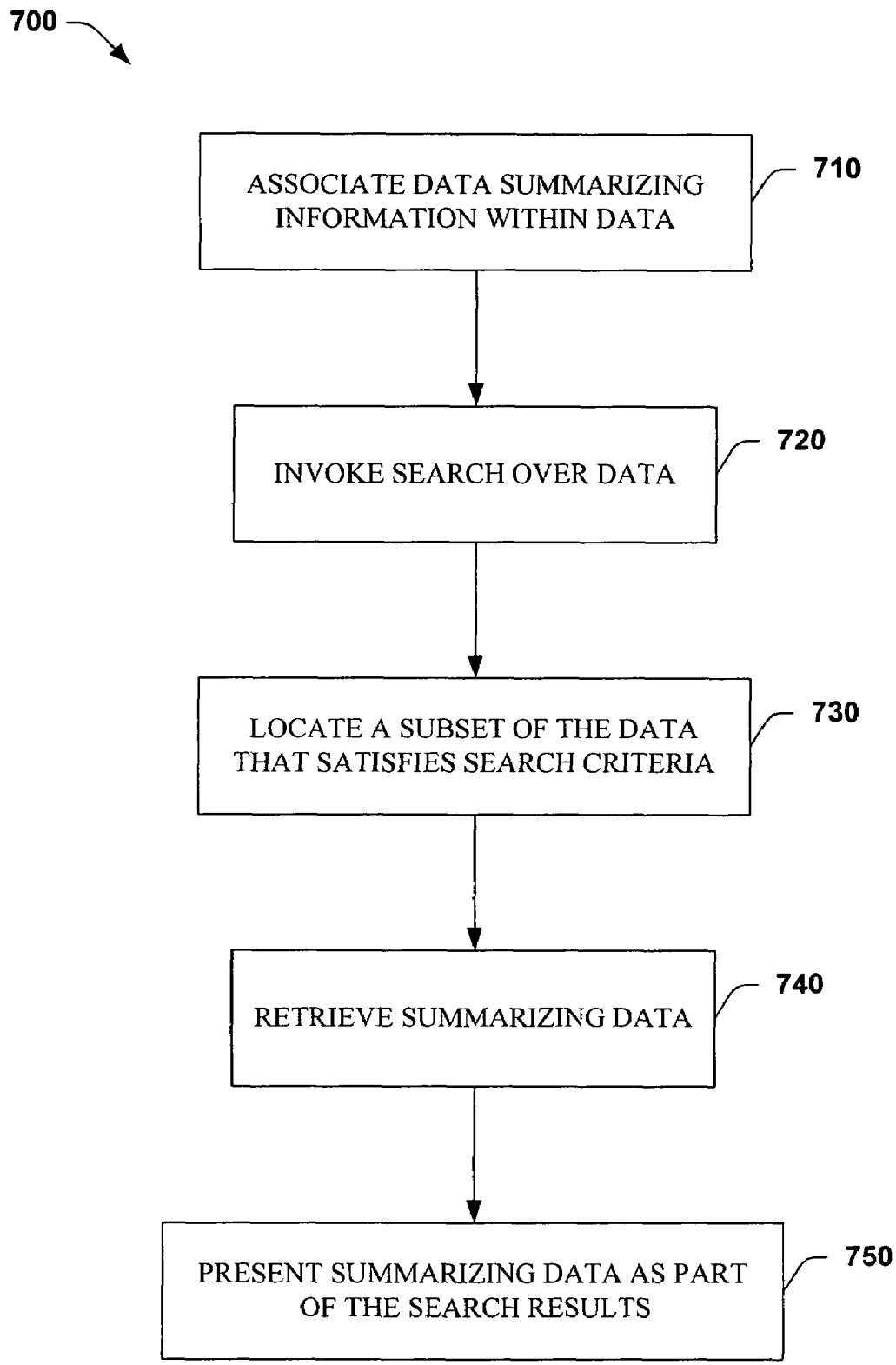
FIG. 7 illustrates an exemplary method that facilitates presenting query-specific snippets with query results.
Figure 8:
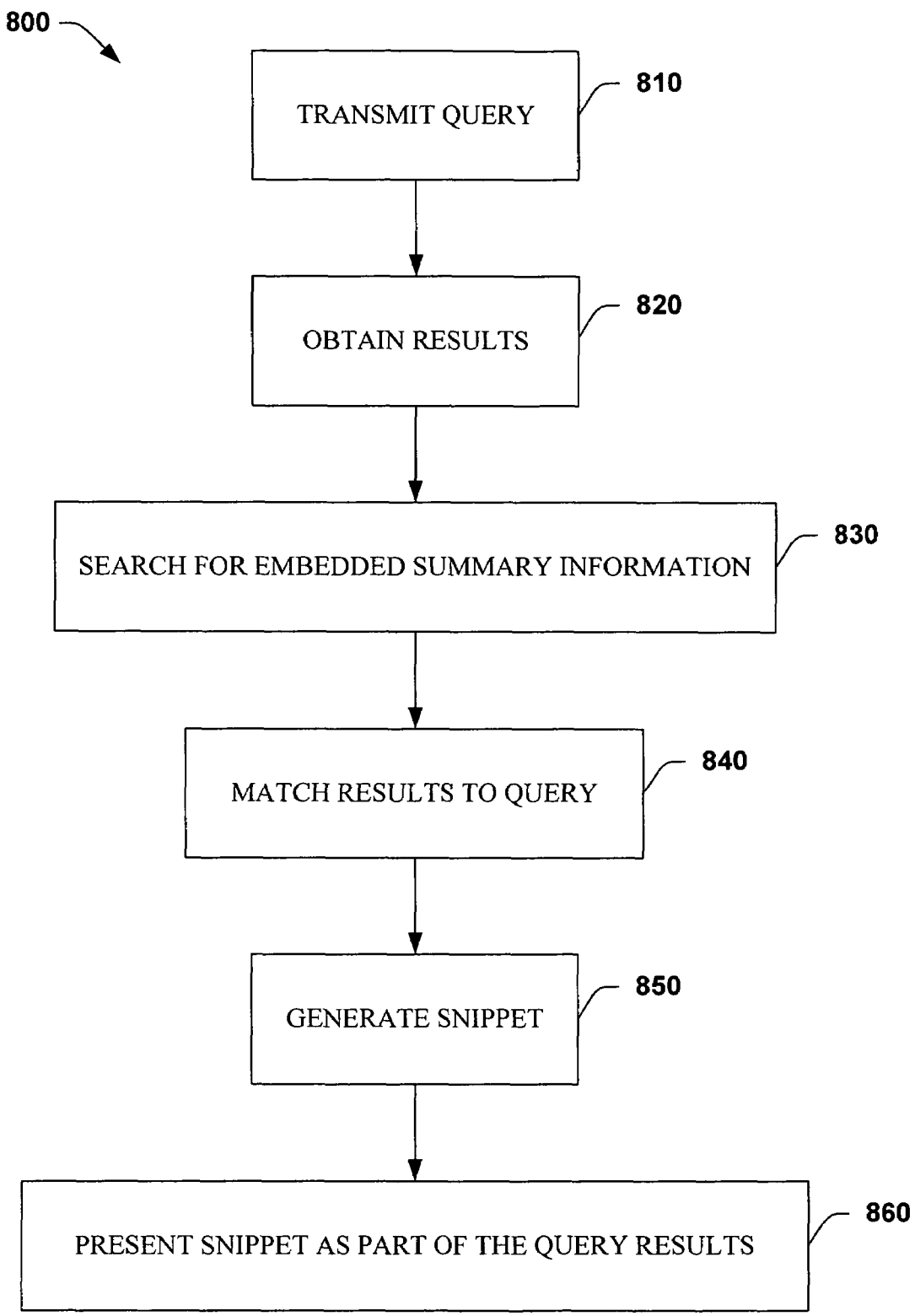
FIG. 8 illustrates an exemplary method for determining whether a snippet matches a given query.

FIGS. 7-8 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 7 illustrates a method 700 for generating and displaying a snippet as at least part of a result. At reference numeral 710, data that summarizes a page (e.g., a file, a web page, a document . . . ) is associated with the page. This summarizing data can be provided by essentially any automatic and/or manual mechanism. For example, the summarizing data can be created by an author of the page and/or other person or mechanism with suitable privileges. This summarizing data can represent informative data that summarizes the page. Such summarizing data can be included in the header, body, etc. of the page, in meta-data associated with the page, in source code utilized to generate the page, etc. The page, along with various other pages that may or may not include summarizing data, can be stored in a data repository. It is to be appreciated that the data repository can be a database, a server, a hard drive, a computer and the like. In addition, the data repository can be accessed through a network (e.g., an intranet, an internet and the Internet), a bus, a backplane, hard wire, wireless technology, etc.

At reference numeral 720, a user invokes a search over the data. Such search can include various search criteria such a keyword, one or more terms, a phrase, a sentence, a date, a page author, etc. In addition, the search can be achieved through essentially any search mechanism. For example, a search engine can be employed for the search. At 730, at least a subset of the data in the repository that satisfies the search criteria is obtained. Any known technique can be utilized to facilitate retrieving data that satisfies the search criteria. At reference numeral 740, the summarizing data is retrieved for the subset of returned data. In one aspect of the invention, rich summarizing data can be extracted from the results. In another aspect, the summarizing data can be read from the results. At reference numeral 750, the summarizing data, along with the original query and user information, is utilized to facilitate generating page summarizing data that is returned to the user as at least part of the search results. It is to be appreciated that the summarizing data may or may not by included in the results presented to a user. For example, the results presented to the user can be a list of URLs. To retrieve the contents of a page, another server, database, data store, disk and the like may need to be accessed.

FIG. 8 illustrates a method 800 for obtaining and displaying query-dependent information as at least part of a query result. At reference numeral 810, a query is transmitted. The query can be performed through a search engine, etc. As such, the user can provide various search criteria for the search. For example, the search utility may provide for the user to include search terms, words, phrases, sentences, etc. At reference numeral 820, query results are obtained. Such results can be obtained from a repository of data, wherein the results satisfies the search criteria. Essentially any known technique can be utilized to facilitate retrieving data from the repository. Such repository can be a database, a server, a hard drive, a computer, portable memory, CD, DVD, Optical Disk, Tape, disk, and the like. In addition, the data repository can be accessed through a network (e.g., an intranet, an internet and the Internet), a bus, a backplane, hard wire, wireless technology, etc.

At reference numeral 830, the results and/or associated data (which can be located proximate and/or remote from the results) are searched for embedded summary information. Such summary information is obtained from the results. At reference numeral 840, the embedded information is matched to the query. For example, the embedded summary information can be scrutinized to determine whether it is related to the query. For instance, the search criteria can be obtained and compared with the embedded summary information to whether any similarities exist. If the embedded summary information matches any or all of the search criteria, this information can be utilized to deem the page relevant to the user. In another aspect of the invention, similar search criteria associated with previous searches by the user can also be utilized to facilitate matching summary information with the user's query. For example, the user may submit a subsequent query utilizing synonyms and/or variations of the search terms from a previous query. Such information can be utilized in conjunction with the current search terms. Various matching algorithms can be utilized to determine whether the rich summary information matches the query. Examples of suitable algorithms include, but are not limited to, matching text, patterns, a set of terms, and expressions, as describe in detail in connection with system 200 of FIG. 2.

At reference numeral 850, the embedded summary information is utilized to determine a snippet to provide with the query results. Various algorithms can be utilized to determine and/or generate a snippet. Examples of suitable algorithms include, but are not limited to, text, text with replacement, and pointers to one or more page locations, as described in detail in connection with the system 300 of FIG. 3. These algorithms can take into account previous user actions, such as clicks in response to previous search results, changes to search criteria, downloaded information, pages saved to local storage medium, a search history, a browsed result, etc. In one particular example, pointers provide for pointing to one or more existing sentences/fragments in a page, wherein the sentences/fragments contain useful information about the queried words. These locations can be specified within a HTML standard by using anchor tags (<a>) or the like. The following provides one such example: " . . . that <a name=dog_umbrellas> we carry the best selection of dog umbrellas in the world!</a> . . . " At reference numeral 860, the snippet and/or link thereto is presented as at least part of the results.

Figure 9:
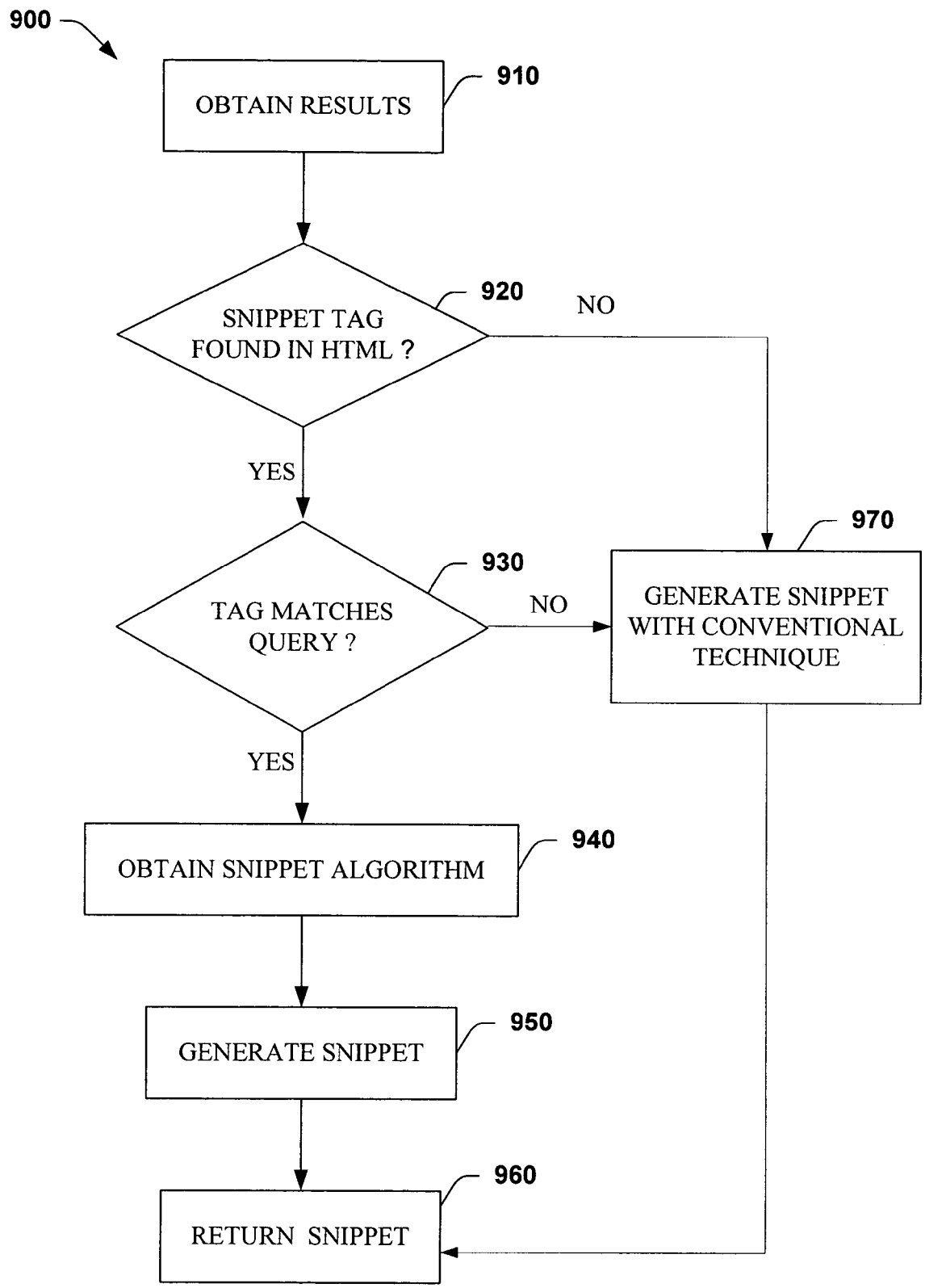
FIG. 9 illustrates an exemplary flow chart for determining how a snippet is generated.

FIG. 9 illustrates a flow chart 900 for providing query-independent and/or query-dependent summaries to a user. At reference numeral 910, query results are obtained. Such results can be obtained through a query as described herein. At reference numeral 920, it is determined whether any of the results include a snippet tag. Such tag can be substantially similar to the HTML snippets 500 depicted in FIG. 5. As such, the tag can include matching criteria that is utilized to match the snippet with the query, and snippet generating criteria that are utilized to generate a snippet to present to the user. At reference numeral 930, it is determined whether the snippet tag matches the query. This can be achieved by matching the search criteria based on the matching criteria. Examples of suitable matching criteria include, but are not limited to, matching text, patterns, a set of terms, and expressions, as described in detail in connection with system 200 of FIG. 2. At reference numeral 940, a snippet generating schema is obtained. Examples of suitable schema include, but are not limited to, text, text with replacement, and pointers to one or more page locations, as described in detail in connection with the system 300 of FIG. 3. At reference numeral 950, the schema is utilized to generate a query-dependent snippet, and at 960 the query-dependent snippet is provided to the user. Alternatively, if either a snippet is not found at 920 or a tag does not match the query at 930, a conventional snippet generating technique can be utilized.

Figure 10:
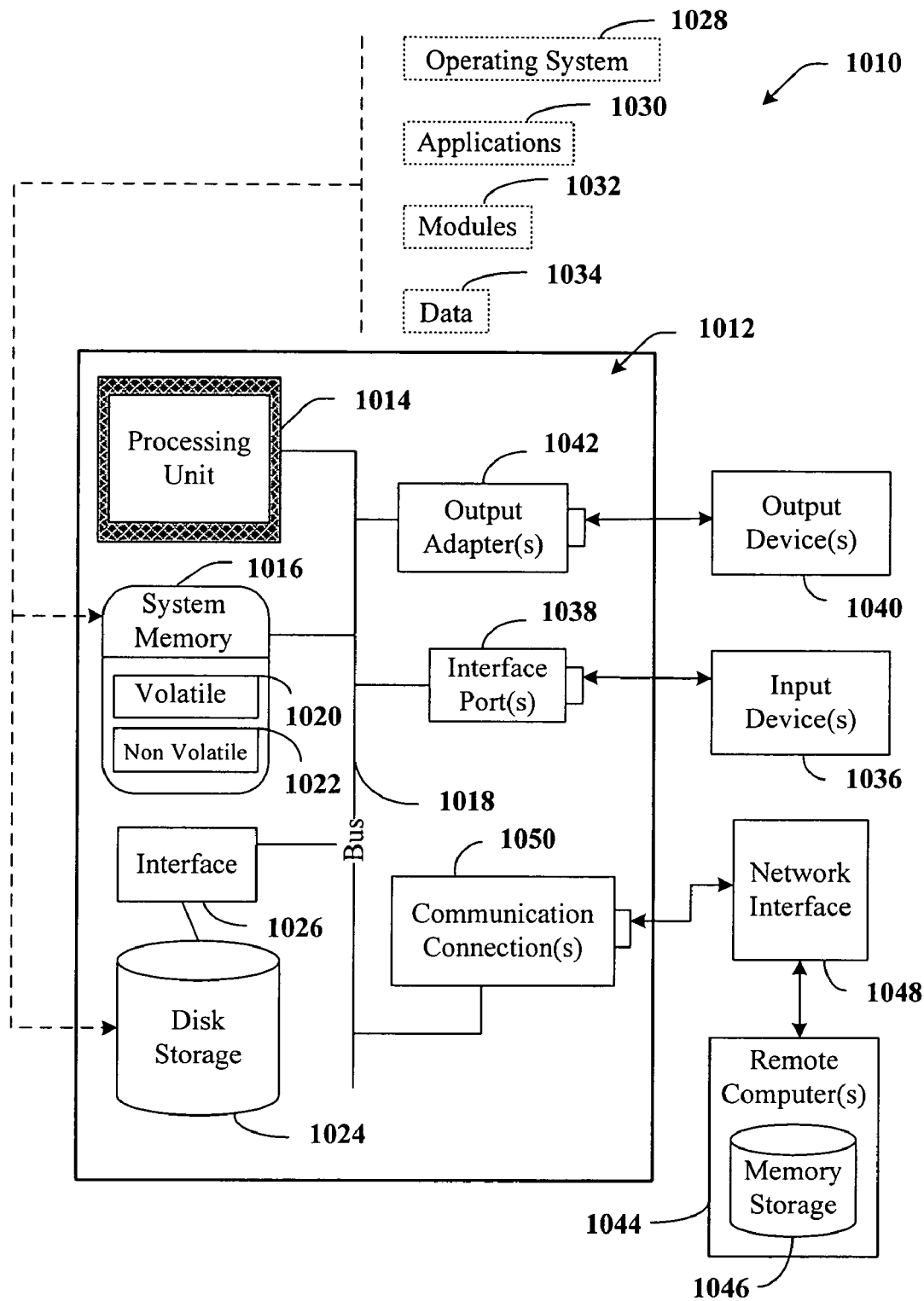
FIG. 10 illustrates an exemplary computing architecture that can be employed in connection with the subject invention.
Figure 11:
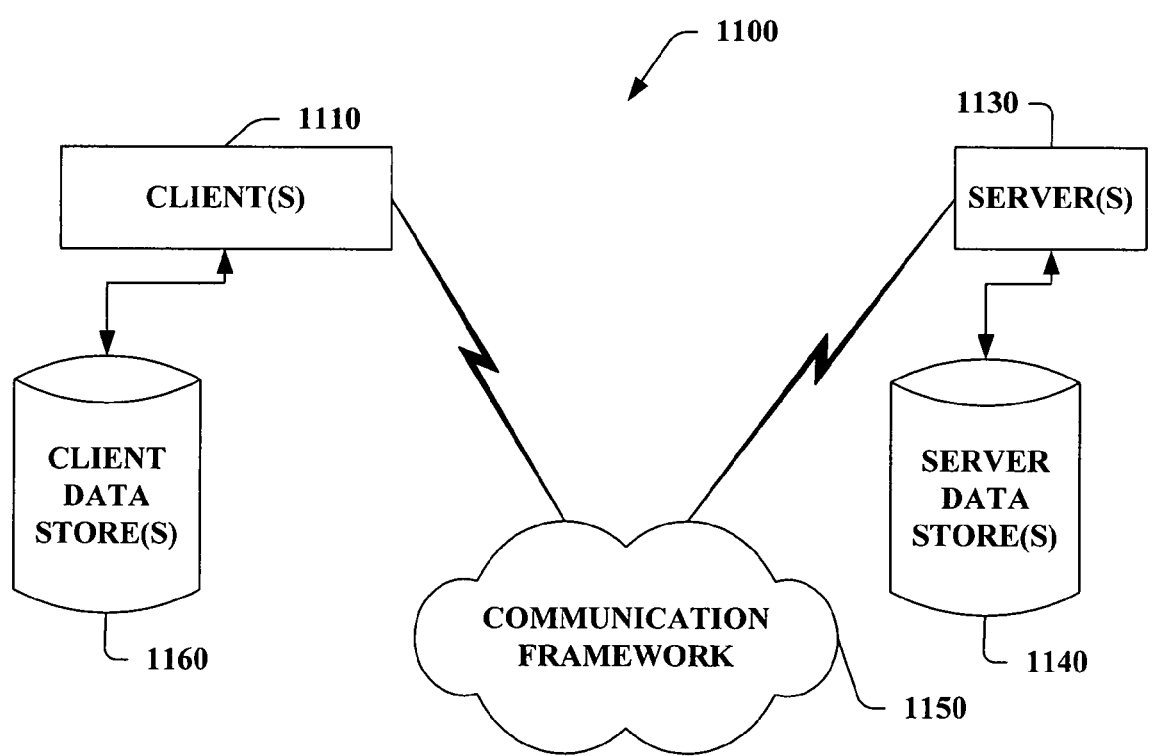
FIG. 11 illustrates an exemplary networking environment that can be employed in connection with the subject invention.

In order to provide a context for the various aspects of the invention, FIGS. 10 and 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 10-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and Rambus Direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system embodied on a computer-readable storage medium that facilitates generating a relevant summary snippet for a retrieved search result, comprising:
a matching component that compares rich summary information embedded within the retrieved document with at least one search term used in the query that invoked retrieval of the document, and selects a subset of the rich summary information that is relevant to the at least one search term, wherein the rich summary information contains multiple subsets of information, each subset of information has been tagged to indicate that the subset contains query-specific summary information and each tagged subset has been associated with matching criteria by the creator of the rich summary information, at least two of the tagged subsets of information are associated with different matching criteria, the matching criteria comprising at least one expression that matches the associated subset with one or more queries; and
an assembler component that generates a query-specific summary of the document based at least on the relevant subset of rich summary information returned by the matching component.

2. The system of claim 1, the rich information is embedded within one or more of the document, a markup language, an HTML page, or data associated with and located remote from the document.

3. The system of claim 1, the creator of the rich information is one of an automatic summary generating mechanism, or a user with privileges to associate the rich information with the document.

4. The system of claim 1, the summary is dependent on one or more of the search, a history of searches initiated by a user, a browsed result, downloaded data, a change to a search criterion, or a page saved to a local storage medium.

5. The system of claim 1, the rich information is specified through at least one of an HTML meta tags, or an HTML anchor tag.

6. The system of claim 1, the matching component employs an algorithm that matches at least one of text, a pattern, a set of terms, or an expression when matching the rich information with the query.

7. The system of claim 1, the assembler component employs an algorithm that generates summary snippets based on at least one of text, text with replacement, a pointer to a location within the document, or a pointer to a location within an associated document.

8. The system of claim 1, the rich information is located in one or more of a header, a body, related meta-data, source generating code, or a remote link.

9. The system of claim 1, the summary provides at least one of query-dependent or query-independent information to a user.

10. The system of claim 1, is employed in connection with one of a web search engine, a local search engine, or a query-result browsing application.

11. The system of claim 1, the document includes at least one of text, an image, audio, or video.

12. A computer readable medium having stored thereon the components of the system of claim 1.

13. A data packet communicated between computer components to facilitate the system of claim 1.

14. A method that facilitates presenting query-relevant summary snippets with query results, comprising:
retrieving summary information from retrieved data, wherein the summary information contains multiple subsets of information, each subset of information has been tagged to indicate that the subset contains query-specific summary information and each tagged subset has been associated with matching criteria by the creator of the summary information, at least two of the subsets of information are associated with different matching criteria, the matching criteria comprising at least one expression utilized to match one or more queries with the associated subset;
determining at least one subset of summary information that is relevant to the search terms used in the query that invoked retrieval of the data by comparing the search terms with the matching criteria associated with each subset;
generating a summary snippet based at least on the at least one subset of summary information deemed relevant to the search terms; and
returning the summary snippet to a user who initiated the query.

15. The method of claim 14, further comprising determining whether the retrieved data is relevant to the query by matching the retrieved summary information with at least one search term utilized in the query.

16. The method of claim 14, further comprising utilizing a matching scheme to determine a relevance of the retrieved data with respect to the query, the matching scheme matches at least one of text, a pattern, a set of terms, or an expression within the summary information with query criteria.

17. The method of claim 14, further comprising obtaining the summary information from a tag associated with the data.

18. The method of claim 14, further comprising determining the summary snippet based on one or more of the query, a history of queries, a browsed result, downloaded data, a change to a search criterion, or a page saved to a local storage medium.

19. The method of claim 14, further comprising returning a link to the summary snippet to the user.

20. A system embodied on a computer-readable storage medium that facilitates presenting relevant summary snippets with search results, comprising:

means for matching rich summary information embedded within a retrieved document with query criteria that invoked retrieval of the document, the rich summary information contains multiple subsets of information, each subset of information has been tagged to indicate that the subset contains query-specific summary information and each tagged subset has been associated with matching criteria by the creator of the rich summary information, at least two of the subsets of information are associated with different matching criteria, the matching criteria for each subset comprising an expression that facilitates matching one or more search terms with the associated subset;

means for selecting a subset of the rich summary information whose matching criteria is satisfied by at least one search term used in the query;

means for generating a snippet from the rich summary information based at least on the selected subset of rich summary information; and means for presenting the snippet to the query initiator as part of the query result.

* * * * *